US008377337B2

(12) United States Patent
Bastiaens et al.

(10) Patent No.: US 8,377,337 B2
(45) Date of Patent: Feb. 19, 2013

(54) METHOD OF INCORPORATING AN ADDITIVE INTO A POLYAMIDE-POLY(ARYLENE ETHER) COMPOSITION, COMPOSITION PREPARED THEREBY, AND ARTICLE COMPRISING THE COMPOSITION

(75) Inventors: Jos Bastiaens, Berendrecht (BE); Arno Hagenaars, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 257 days.

(21) Appl. No.: 12/773,044

(22) Filed: May 4, 2010

(65) Prior Publication Data

US 2011/0272640 A1 Nov. 10, 2011

(51) Int. Cl.
*H01B 1/06* (2006.01)
*C08K 3/34* (2006.01)
*C04B 14/04* (2006.01)

(52) U.S. Cl. .................... 252/511; 524/447; 106/486

(58) Field of Classification Search ........ 252/500–521.6; 524/447; 106/486
See application file for complete search history.

(56) References Cited

U.S. PATENT DOCUMENTS

| | | | |
|---|---|---|---|
| 2,071,250 A | 7/1931 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 4,565,684 A | 1/1986 | Tibbetts et al. | |
| 4,572,813 A | 2/1986 | Arakawa | |
| 4,663,230 A | 5/1987 | Tennent | |
| 4,816,289 A | 3/1989 | Komatsu et al. | |
| 4,876,078 A | 10/1989 | Arakawa et al. | |
| 4,970,272 A | 11/1990 | Gallucci | |
| 5,024,818 A | 6/1991 | Tibbets et al. | |
| 5,132,365 A | 7/1992 | Gallucci | |
| 5,165,909 A | 11/1992 | Tennent et al. | |
| 5,589,152 A | 12/1996 | Tennent et al. | |
| 5,591,382 A | 1/1997 | Nahass et al. | |
| 6,228,903 B1 | 5/2001 | Beall et al. | |
| 6,350,805 B1 | 2/2002 | Korbee et al. | |
| 6,593,411 B2 | 7/2003 | Koevoets et al. | |
| 7,223,811 B2 | 5/2007 | Nagy et al. | |
| 7,226,963 B2 | 6/2007 | Koevoets et al. | |
| 2002/0198321 A1* | 12/2002 | Nakamura ................. 525/132 |
| 2004/0232389 A1* | 11/2004 | Elkovitch ................. 252/500 |
| 2006/0058432 A1* | 3/2006 | Perego et al. ............. 524/115 |
| 2006/0122310 A1 | 6/2006 | Matthijssen | |
| 2009/0256119 A1 | 10/2009 | Bastiaens et al. | |
| 2009/0289234 A1 | 11/2009 | Blau et al. | |
| 2011/0220851 A1 | 9/2011 | Sue et al. | |

FOREIGN PATENT DOCUMENTS

| | | | |
|---|---|---|---|
| DE | 10002992 | * | 7/2006 |
| WO | 2007/119231 A1 | | 10/2007 |
| WO | 2009125315 A1 | | 10/2009 |

OTHER PUBLICATIONS

Liu et al., "Clay Assisted Dispersion of Carbon Nanotubes in Conductive Epoxy Nanocomposites", Advanced Functional Materials, 17, 2002, pp. 2343-2348.
PCT/IB2011/051960 International Search Report, mailing date Aug. 4, 2011, 5 pages.
PCT/IB2011/051960 Written Opinion, mailing date Aug. 4, 2011, 7 pages.
Wang et al., "A Simple Method for Preparing Carbon Nanotubes/Clay Hybrids in Water", J. Physc. Chem. C. 113, 2009, pp. 8058-8064.
PCT/IB2011/051892 International Search Report, mailing date Sep. 6, 2011, 4 pages.
PCT/IB2011/051892 Written Opinion, mailing date Sep. 6, 2011, 6 pages.
DE 10002992 Abstract, Publication date: Jul. 26, 2001, 1 page.
Doggen, Potential of nano-scale fillers, PPCJ—Nov. 2009 www.coatingsgroup.com, 4 pages.
Gahleitner et al., "Morphology and Mechanical Properties of Polypropylene/Polyamide 6 Nanocomposites Prepared by a Two-Step Melt-Compounding Process", Journal of Applied Polymer Science 100 (2006) pp. 283-291.
Li et al., Properties of carbon black/polypropylene nanocomposites with low percolation threshold prepared by mild blending method (Gaofenzi Xuebao 2009, (1), 40-44 (in Chinese) , CA Selects: Polymer Blends, Issue 5, vol. 2010, p. 16.
DaimerChrysler AG letter to Mr. Rudolf Nuss, English Translation of Joint Project: "Light Construction with Thermoplastic Nanocomposites (LB-Nanos)" Collaboration Agreement, Version: Dec. 12, 2005, 15 pages.
Nanocyl NC7000 series—Product Datasheet—Thin Multi-Wall Carbon Nanotubes, Mar. 10, 2009, V05, 1 page.
Optigel/Laponite, Theological Additives for Aqueous Systems, Optigel Formulations—Products and Applications, Product Overview, No date, 8 pages.
Plasticyl Carbon Nanotubes Conductive Masterbatches, http://www.nanocyl.com/Products-Solutions/Products/PLASTICYL-Carbon-Nanotubes-Conductive-Masterbatches[Jan. 22, 2010 10:33:10 AM], 1 page.
Plasticyl PA1501/Product Data Sheet, Mar. 4, 2009, V05, 3 pages.
DE10002992, Publication date: Jul. 26, 2001, Abstract Only, 1 page.
Li et al., Properties of carbon black/polypropylene nanocomposites with low percolation threshold prepared by mild blending method (Gaofenzi Xuebao 2009, (1), 40-44 Abstract Only, 1 page.

* cited by examiner

*Primary Examiner* — Mark Kopec
*Assistant Examiner* — Jaison Thomas
(74) *Attorney, Agent, or Firm* — Cantor Colburn LLP

(57) ABSTRACT

A method of incorporating an additive into a polyamide-poly (arylene ether) composition includes the step of melt blending a polyamide, a poly(arylene ether), and a dispersion comprising a liquid carrier, an unmodified clay, and an additive. Using the dispersion rather than a polymer-based additive masterbatch saves energy. Like a polymer-based masterbatch, the dispersion provides the additive in a diluted form and therefore preserves the masterbatch's advantages of providing more uniform distribution additive in the plastic and avoiding direct handling of additives in the final compounding step.

12 Claims, No Drawings

METHOD OF INCORPORATING AN ADDITIVE INTO A POLYAMIDE-POLY(ARYLENE ETHER) COMPOSITION, COMPOSITION PREPARED THEREBY, AND ARTICLE COMPRISING THE COMPOSITION

BACKGROUND OF THE INVENTION

Many plastics are provided as blends that include not only plastic resin but also one or more additives that improve the appearance and/or properties of the plastic. For example, in certain electrically conductive blends of polyamide and poly(arylene ether) resins used to fabricate electrostatically painted automotive parts, the electrical conductivity of the blends can be provided by a small amount of carbon nanotubes present as an additive in the blends. In order to improve the uniformity of additive distribution in the plastic and, in some cases, to avoid direct handling of the additive in the final compounding step, the additive is often incorporated into an intermediate plastic composition, known as a masterbatch, and the masterbatch is then combined with other components to form the final plastic composition.

The formation of the masterbatch requires a separate melt blending step that is energy intensive. There is therefore a desire for a less energy intensive means of incorporating additives into plastics, while still preserving the masterbatch's advantages of providing more uniform distribution additive in the plastic and avoiding direct handling of additives in the final compounding step.

BRIEF DESCRIPTION OF THE INVENTION

One embodiment is a method of incorporating an additive into a polyamide-poly(arylene ether) composition, comprising: melt blending a polyamide, a poly(arylene ether), and a dispersion comprising a liquid carrier, an unmodified clay, and an additive.

Other embodiments, including the dispersion used to form the polyamide-poly(arylene ether) composition, are described in detail below.

DETAILED DESCRIPTION OF THE INVENTION

The present inventors have found that additives can be efficiently incorporated into polyamide-poly(arylene ether) compositions by first forming a specific dispersion of the additive, then melt blending the dispersion with the polyamide, the poly(arylene ether), and any other optional components. Thus, one embodiment is a method of incorporating an additive into a polyamide-poly(arylene ether) composition, comprising: melt blending a polyamide, a poly(arylene ether), and a dispersion comprising a liquid carrier, an unmodified clay, and an additive. Forming the dispersion is significantly less energy intensive than forming a corresponding additive masterbatch, with energy savings resulting both from a lower preparation temperature and from reduction in the mechanical energy required for mixing. Like a masterbatch, the dispersion provides the additive in a diluted form and therefore preserves the masterbatch's advantages of providing more uniform distribution of additive in the plastic and avoiding direct handling of additive in the final compounding step.

The method requires melt blending of the polyamide, the poly(arylene ether), and the dispersion. It will be understood that the method includes embodiments in which the polyamide and the dispersion are melt blended with each other, and the resulting product is subsequently melt blended with the poly(arylene ether) (without or with intermediate cooling and/or pelletization of the product of melt blending the polyamide and the dispersion). The method also includes embodiments in which the poly(arylene ether) and the dispersion are melt blended with each other, and the resulting product is subsequently melt blended with the polyamide (without or with intermediate cooling and/or pelletization of the product of melt blending the poly(arylene ether) and the dispersion).

Melt blending of the polyamide, the poly(arylene ether), and the dispersion is typically conducted at a temperature that is above the glass transition temperature and/or melting temperature of the polyamide and poly(arylene ether) employed, provided that the temperature is not so high as to cause undesired decomposition of the polyamide, the poly(arylene ether), and/or additive(s). For example, melt blending is typically conducted at a temperature of about 270 to about 320° C., specifically about 280 to about 310° C., more specifically about 290 to about 300° C. The term "undesired decomposition" is intended to exclude desired reactions between components, such as the desired compatibilization reaction between a poly(arylene ether), a polyamide, and, optionally, a compatibilizing agent such as citric acid. Apparatus for melt blending is known in the art and includes, for example, Brabender mixers and extruders, including single-screw extruders and twin-screw extruders.

In some embodiments, melt blending is conducted under conditions effective to evaporate the liquid carrier. For example, when the liquid carrier is water and melt blending is conducted in an extruder, some or essentially all of the free (unbound) water provided by the dispersion can be removed from the melt blended composition via venting of the extruder. In some embodiments, the extruder is equipped with one or more so-called vacuum vents that are maintained at sub-atmospheric pressure to facilitate removal of the liquid carrier from the compounded composition. Thus, in some embodiments, it is possible to evaporate (remove) at least 90 weight percent, or at least 95 weight percent, or at least 98 weight percent of the free liquid carrier from the composition. In this context, it will be understood that "free liquid carrier" does not include any liquid carrier that is bound to another component of the composition, such as water bound to the unmodified clay.

Alternatively, in some embodiments, melt blending is conducted under conditions such that substantially all of the liquid carrier remains in the compounded composition. For example, when the liquid carrier is mineral oil, it typically will remain in the compounded composition.

A polyamide is one of the melt-blended components. Polyamides, also known as nylons, are characterized by the presence of a plurality of amide (—C(O)NH—) groups, and are described in U.S. Pat. No. 4,970,272 to Gallucci. Suitable polyamides include polyamide-6, polyamide-6,6, polyamide-4, polyamide-4,6, polyamide-12, polyamide-6,10, polyamide 6,9, polyamide-6,12, amorphous polyamides, polyamide 6/6T and polyamide 6,6/6T with triamine contents below 0.5 weight percent, polyamide 9T, and combinations thereof. In some embodiments, the polyamide comprises polyamide-6,6. In some embodiments, the polyamide comprises polyamide-6 and polyamide-6,6. In some embodiments, the polyamide has a melting point ($T_m$) greater than or equal to 171° C. When the polyamide comprises a super tough polyamide, that is, a rubber-toughened polyamide, the composition may or may not contain a separate impact modifier.

Polyamides may be obtained by a number of well known processes such as those described in U.S. Pat. Nos. 2,071,250, 2,071,251, 2,130,523, and 2,130,948 to Carothers; 2,241,322 and 2,312,966 to Hanford; and 2,512,606 to Bolton et al. Polyamides are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent (wt %) solution in 96 wt % sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 weight percent solution in 96 weight percent sulfuric acid.

In one embodiment, the polyamide comprises a polyamide having an amine end group concentration greater than or equal to 35 micro equivalents amine end group per gram of polyamide (μeq/g) as determined by titration with HCl. The amine end group concentration may be greater than or equal to 40 μeq/g, or, more specifically, greater than or equal to 45 μeq/g Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The polyamide is typically used in an amount of about 30 to about 70 weight percent, based on the total weight of the polyamide-poly(arylene ether) composition. Within this range, the polyamide amount can be about 35 to about 65 weight percent, specifically about 40 to about 60 weight percent, more specifically about 45 to about 55 weight percent.

A poly(arylene ether) is one of the melt-blended components. The poly(arylene ether) used to form the polyamide-poly(arylene ether) composition comprises repeating structural units of the formula

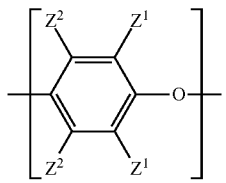

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$, hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) consists of poly(2,6-dimethyl-1,4-phenylene ether). In this context, the term "consists of" excludes the reaction products of poly(arylene ether)s and functionalizing agents, such as acid-functionalized poly(arylene ether)s and anhydride-functionalized poly(arylene ether)s.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) is typically used in an amount of about 20 to about 50 weight percent, based on the total weight of the polyamide-poly(arylene ether) composition. Within this range, the poly(arylene ether) amount can be about 25 to about 45 weight percent, specifically about 30 to about 40 weight percent, more specifically about 32 to about 38 weight percent.

While the method is described as using polyamide and poly(arylene ether), it will be understood that the additive dispersions can be used with a wide variety of polymers, including thermoplastics, thermoplastic elastomers, elastomers, and thermosets, provided that melt blending of thermosets is conducted under conditions not effective to substantially cure the thermosets. Thermoplastics include, for example, polycarbonates, polyesters (such as poly(ethylene terephthalate), amorphous poly(ethylene terephthalate), and poly(butylene terephthalate)), polyamides (such as polyamide-1,1, polyamide-1,2, polyamide-4,6, polyamide-4T, polyamide-6, polyamide-6,6, polyamide-6,10, polyamide-6, 12, polyamide-6T, polyamide-6I, polyamide-9T, polyphthalamide), polyimides, polyetherimides, polyurethanes, polystyrenes, poly(arylene ether)s, poly(phenylene sulfide)s, polyarylsulfones, polyethersulfones, poly(ether ketone)s, poly(ether ether ketone)s, polyacrylates (such as poly(methyl methacrylate) and poly(butyl acrylate)), poly(vinyl butyral), polyethylenes (such as high density polyethylenes, low density polyethylenes, and linear low density polyethylenes), chlorinated polyethylenes, polytetrachloroethylenes, polypropylenes, poly(vinyl acetate), polyacrylonitriles, poly(vinyl chloride), poly(vinyl fluoride), poly(vinylidene fluoride), polytetrafluoroethylenes, copolymers comprising repeat units derived from ethylene, copolymers comprising repeat units derived from propylene, copolymers comprising repeat units derived from styrene, copolymers of ethylene and polytetrafluoroethylene, copolymers of vinylidene chloride and vinyl chloride, copolymers of vinyl acetate and vinylidene chloride, copolymers of styrene and acrylonitrile, copolymers of alpha-methylstyrene and acrylonitrile, polyacetals, and the like, and combinations thereof. Thermoplastic elastomers include, for example styrenic block copolymers (such as polystyrene-polybutadiene block copolymers, polystyrene-poly(ethylene-propylene) block copolymers, and polystyrene-poly(ethylene-butylene) block copolymers), polyolefin blends, elastomeric alloys (including thermoplastic vulcanizates), thermoplastic polyurethanes, thermoplastic copolyesters, rubber-modified polystyrenes, and the like, and combinations thereof. Elastomers include natural rubber, polybutadienes, polyisoprenes, copolymers of isobutylene and isoprene, copolymers of styrene and butadiene (styrene-butadiene rubber), copolymers of butadiene and acrylonitrile, copolymers of acrylonitrile and styrene and acrylate esters, copolymers of acrylonitrile and butadiene and styrene, polychloroprenes, copolymers of ethylene and propylene (ethylene-propylene rubber), polysiloxanes, fluorosilicone rubbers, polyether block amides, copolymers of ethylene and vinyl acetate, and the like, and combinations thereof. Thermosets include, for example, melamine, epoxy resins, cyanate ester resins, maleimide resins, benzoxazine resins, vinylbenzyl ether resins, alkene-containing monomers, alkyne-containing monomers, arylcyclobutene resins, perfluorovinyl ether resins, and oligomers and polymers with curable vinyl functionality, and combinations thereof.

In some embodiments, the polymer is selected from the group consisting of polyesters, melamines, poly(vinyl chloride)s, polystyrenes, polyethylenes, chlorinated polyethylenes, polytetrachloroethylenes, polypropylenes, polycarbonates, polyimides, polyetherimides, poly(ether ether ketone)s, polysulfones, poly(arylene ether)s, polyamides, copolymers of styrene and acrylonitrile, copolymers of alpha-methylstyrene and acrylonitrile, copolymers of acrylonitrile and butadiene and styrene, copolymers of acrylonitrile and styrene and acrylate esters, polyacetals, copolymers of ethylene and polytetrafluoroethylene, rubber-modified polystyrenes, polyurethanes, and combinations thereof.

A compatibilizing agent can be used to facilitate formation of a compatibilized blend of the polyamide and the poly(arylene ether). As used herein, the term "compatibilizing agent" refers to a polyfunctional compound that interacts with the poly(arylene ether), the polyamide resin, or both. This interaction may be chemical (for example, grafting) and/or physical (for example, affecting the surface characteristics of the dispersed phases). In either instance the resulting compatibilized blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that may be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. Nos. 5,132,365 to Gallucci, and 6,593,411 and 7,226,963 to Koevoets et al.

In some embodiments, the compatibilizing agent comprises a polyfunctional compound. Polyfunctional compounds that may be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acid, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with —NH$_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

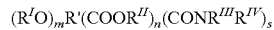

$$(R^IO)_mR'(COOR^{II})_n(CONR^{III}R^{IV})_s$$

wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents may be added directly to the melt blend or pre-reacted with either or both of the poly(arylene ether) and the polyamide, as well as with any other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with and consequently functionalize the poly(arylene ether). For example, the poly(arylene ether) may be pre-reacted with maleic anhydride to form an anhydride-functionalized poly(arylene ether) that has improved compatibility with the polyamide compared to a non-functionalized poly(arylene ether).

Where a compatibilizing agent is employed in the preparation of the compatibilized polyamide-poly(arylene ether) composition, the amount used will be dependent upon the specific compatibilizing agent chosen and the specific polymeric system to which it is added. In some embodiments, the compatibilizing agent amount is about 0.1 to about 1 weight percent, specifically about 0.2 to about 0.8 weight percent, more specifically about 0.3 to about 0.6 weight percent, based on the total weight of the thermoplastic composition.

The polyamide and poly(arylene ether) are melt blended with a dispersion that comprises a liquid carrier, an unmodified clay, and an additive. Suitable liquid carriers include, for example, water, $C_1$-$C_{18}$ alcohols (including methanol, ethanol, n-propanol, and isopropanol), $C_2$-$C_{18}$ aldehydes (including acetaldehyde), $C_3$-$C_{18}$ ketones (including acetone and methyl ethyl ketone), $C_3$-$C_{18}$ esters (including ethyl acetate), $C_2$-$C_{18}$ ethers (including diethyl ether and tetrahydrofuran), mineral oils, organic oils, $C_4$-$C_{18}$ aliphatic hydrocarbon solvents (including pentanes, hexanes, and heptanes), $C_6$-$C_{18}$ aromatic hydrocarbon solvents (including benzene, toluene, and xylenes), liquidized gases (including supercritical fluids such as supercritical carbon dioxide), and mixtures thereof.

In some embodiments, the liquid carrier comprises water. In some embodiments, the liquid carrier comprises water in an amount of at least 90 weight percent, or at least 95 weight percent, or at least 98 weight percent, or at least 99 weight percent, based on the weight of the liquid carrier. In some embodiments, the liquid carrier consists of water.

In some embodiments, the dispersion comprises the liquid carrier in an amount of about 80 to about 98.9 weight percent, based on the weight of the dispersion. Within this range, the liquid carrier amount can be about 85 to about 98.5 weight percent, specifically about 87 to about 98 weight percent, more specifically about 91 to about 96 weight percent, even more specifically about 91 to about 94 weight percent.

In addition to the liquid carrier, the dispersion comprises an unmodified clay. In this context, "unmodified" means that the clay has not been treated with an agent to increase its hydrophobicity. Thus, the term "unmodified clay" exclude so-called organoclays. Unmodified clays can have chemical compositions identical to those of naturally occurring mineral forms. However, unmodified clays can further include clays that have been physically or chemically treated, as long as such chemical treatment does not include treatment with an agent to increase the hydrophobicity of the clay. Thus, included among unmodified clays are clays that have been treated to effect exchange of a naturally occurring inorganic counterion for another inorganic counterion. For example, one unmodified clay is the product of treating a natural montmorillonite to substitute protons or potassium counterions for naturally occurring sodium counterions.

Unmodified clays include, for example, kaolinite, dicktite, nacrite, pyrophyllite, talc, vermiculite, sauconite, saponite, nontronite, montmorillonite, illite, amesite, baileychlore, chamosite, clinochlore (kaemmererite), cookeite, corundophilite, daphnite, delessite, gonyerite, nimite, odinite, orthochamosite, penninite, pannantite, rhipidolite (prochlore), sudoite, thuringite, and mixtures thereof.

In some embodiments, the unmodified clay comprises montmorillonite. In some embodiments, the unmodified clay comprises montmorillonite in an amount of at least 90 weight percent, or at least 95 weight percent, or at least 98 weight percent, or at least 99 weight percent, based on the weight of the unmodified clay. In some embodiments, the unmodified clay consists of montmorillonite.

In some embodiments, the dispersion comprises the unmodified clay in an amount of about 1 to about 10 weight percent, based on the weight of the dispersion. Within this range, the unmodified clay amount can be about 2 to about 8 weight percent, specifically about 3 to about 6 weight percent, more specifically about 3 to about 5 weight percent.

Although the method has been described as utilizing an unmodified clay, it will be understood that it is possible to substitute alternative rheological modifiers. Other suitable rheological modifiers include the synthetic inorganic materials sold by Rockwood Additives as LAPONITE RD, LAPONITE RDS, LAPONITE 5482, and LAPONITE SL25; and natural smectites, including those sold by Rockwood Additives as OPTIGEL CK, OPTIGEL CL, OPTIGEL CG, and OPTIGEL CMO.

In addition to the liquid carrier and the unmodified clay, the dispersion comprises an additive. Suitable additives include, for example, colorants (including dyes and pigments), electrically conductive agents (including carbon blacks and carbon nanotubes), stabilizers, antioxidants, mold release agents, flame retardants, drip retardants, UV blockers, fragrances, anti-static agents, metal deactivators, antiblocking agents, impact modifiers, and fillers (including minerals, glass fibers and carbon fibers). In a given dispersion, the additive is distinct from the unmodified clay. Thus, an unmodified clay cannot serve as both the dispersion's unmodified clay and its mineral filler additive.

In some embodiments, the additive comprises conductive carbon black, carbon nanotubes, or a combination thereof. In some embodiments, the additive comprises carbon nanotubes. In some embodiments, the additive comprises carbon nanotubes in an amount of at least 90 weight percent, or at least 95 weight percent, or at least 98 weight percent, or at least 99 weight percent, based on the weight of the additive. In some embodiments, the additive consists of carbon nanotubes.

The carbon nanotubes used can undergo roping and can be single wall carbon nanotubes (SWNTs) and/or multiwall carbon nanotubes (MWNTs). Carbon nanotubes used in the carbon nanotube composition may be produced by laser-evaporation of graphite, chemical vapor deposition, carbon arc synthesis, or the high-pressure carbon monoxide conversion process (HIPCO) process.

The SWNTs generally have a single wall comprising a graphene sheet with outer diameters of about 0.7 to about 2.4 nanometers. It is generally desirable for the SWNTs to have an inherent thermal conductivity of at least 2000 Watts per meter Kelvin (W/m-K) and for the SWNT ropes to have an inherent electrical conductivity of $10^4$ Siemens/centimeter (S/cm). It is also generally desirable for the SWNTs to have a tensile strength of at least 80 gigapascals (GPa) and a stiffness of at least about 0.5 tarapascals (TPa).

In another embodiment, the SWNTs may comprise a mixture of metallic nanotubes and semi-conducting nanotubes. Metallic nanotubes are those that display electrical characteristics similar to metals, while the semi-conducting nanotubes are those that are electrically semi-conducting. In general the manner in which the graphene sheet is rolled up produces nanotubes of various helical structures. Zigzag and armchair nanotubes constitute the two possible confirmations. In order to minimize the quantity of SWNTs utilized in the composition, it is generally desirable to have the metallic nanotubes constitute a large fraction of the total amount of SWNTs used in the composition. It is generally desirable for the SWNTs used in the composition to comprise metallic nanotubes in an amount of greater than or equal to about 1 wt % of the total weight of the SWNTs. In one embodiment, it is desirable to have metallic nanotubes in an amount of greater than or equal to about 20 weight percent, while in another embodiment, it is desirable to have metallic nanotubes in an amount of greater than or equal to about 30 weight percent of the total weight of the SWNTs. In yet another embodiment, it is desirable to have metallic nanotubes in an amount of greater than or equal to about 50 weight percent, while in another embodiment, it is desirable to have metallic nanotubes in an amount of greater than or equal to about 99.9 weight percent of the total weight of the SWNTs.

The MWNTs generally have multiple walls comprising graphene sheet with outer diameters of about 1.4 to about 500 nanometers (nm). MWNTs have at least two graphene layers bound around at least a portion of an inner hollow core. In one embodiment, the MWNTs may have only two graphene layers, while in another embodiment, the MWNTs may have only three graphene layers. MWNTs having only two graphene layers are termed double wall carbon nanotubes, while MWNTs having only three graphene layers are termed triple wall carbon nanotubes. Hemispherical caps generally close both ends of the MWNTs, but it may desirable to use MWNTs having only one hemispherical cap or MWNTs, which are devoid of both caps. It is generally desirable to use MWNTs having average diameters less than or equal to about 40 nanometers. In one embodiment, it is desirable to use MWNTs having diameters of less than or equal to about 30 nanometers, while in another embodiment it is desirable to use MWNTs having diameters less than or equal to about 20 nanometers.

Carbon nanotubes having aspect ratios of greater than or equal to about 5 are generally utilized. In some embodiments, the aspect ratio is greater than or equal to 100, while in other embodiments, the aspect ratio is greater than or equal to 1,000. The carbon nanotubes generally comprise a central portion, which is hollow, but can be filled with amorphous carbon.

It will be understood that the polyamide-poly(arylene ether) composition can include additives in addition to those provided by the dispersion. Thus, any of the additives listed above can be separately added during melt blending of the polyamide, the poly(arylene ether), and the dispersion.

The amount of the additive in the dispersion will depend on factors including the additive type, the effect of the additive on the dispersion rheology, and the desired amount of additive in the final polyamide-poly(arylene ether) composition. In some embodiments, the dispersion comprises the additive in an amount of about 0.1 to about 10 weight percent, based on the weight of the dispersion. Within this range, the additive amount can be about 0.5 to about 8 weight percent, specifically about 1 to about 6 weight percent, more specifically about 2 to about 5 weight percent, even more specifically about 3 to about 4 weight percent.

In some embodiments, the dispersion comprises about 80 to about 98.9 weight percent of the liquid carrier, about 1 to about 10 weight percent of the unmodified clay, and about 0.1 to about 10 weight percent of the additive, wherein the weight percents of the liquid carrier, the unmodified clay, and the additive are based on the weight of the dispersion. Within the range of about 80 to about 98.9 weight percent, the liquid carrier amount can be about 85 to about 98.5 weight percent, specifically about 87 to about 98 weight percent, more specifically about 91 to about 96 weight percent, even more specifically about 91 to about 94 weight percent. Within the range of about 1 to about 10 weight percent, the unmodified clay amount can be about 2 to about 8 weight percent, specifically about 3 to about 6 weight percent, even more specifically about 3 to about 5 weight percent. Within the range of about 0.1 to about 10 weight percent, the additive amount can be about 0.5 to about 8 weight percent, specifically about 1 to about 6 weight percent, more specifically about 2 to about 5 weight percent, even more specifically about 3 to about 4 weight percent.

The dispersion can be prepared simply by mixing the liquid carrier, the unmodified clay, and the additive. In some embodiments, all of the additive is mixed with a portion of the liquid carrier (e.g., ca. 40 to about 80 weight percent of the liquid carrier) and a portion of the unmodified clay (e.g., ca. 30 to about 70 weight percent of the unmodified clay) to form an intermediate mixture with which the remainder of the liquid carrier and the remainder of the clay are subsequently mixed. In some embodiments, the dispersion is allowed to age before use. In some embodiments, the aging time is about 10 to about 40 hours at ambient temperature (e.g., 25° C.). In other embodiments, the aging time is about 30 minutes to about 5 hours at elevated temperature (e.g., 40 to 80° C.). Aging can be accompanied by hydration of the unmodified clay.

In some embodiments, the dispersion has a viscosity of about 10 to about 1,000,000 centipoise, specifically about 100 to about 100,000 centipoise, more specifically about 1,000 to about 10,000 centipoise, as measured at 25° C. and a shear rate in the range of about 50 to about 450 $sec^{-1}$.

In a very specific embodiment, the liquid carrier comprises water, the dispersion comprises about 83 to about 98 weight percent of the liquid carrier, the unmodified clay comprises montmorillonite, the dispersion comprises about 1 to about 10 weight percent of the unmodified clay, the additive comprises carbon nanotubes, the dispersion comprises about 1 to about 7 weight percent of the additive, wherein the weight percents of the liquid carrier, the unmodified clay, and the additives are based on the weight of the dispersion. Within the range of about 83 to about 98 weight percent, the liquid carrier amount can be about 87 to about 96 weight percent, specifically about 91 to about 94 weight percent. Within the range of about 1 to about 10 weight percent, the unmodified clay amount can be about 2 to about 8 weight percent, specifically about 3 to about 5 weight percent. Within the range of about 1 to about 7 weight percent, the additive amount can be about 2 to about 5 weight percent, specifically about 2 to about 4 weight percent.

The invention extends to the dispersion itself. Thus, one embodiment is a dispersion, comprising: about 83 to about 98 weight percent of water; about 1 to about 10 weight percent of an unmodified clay; and about 1 to about 7 weight percent of carbon nanotubes; wherein the weight percents of the water, the unmodified clay, and the carbon nanotubes are based on the weight of the dispersion. Within the range of about 83 to about 98 weight percent, the water amount can be about 87 to about 96 weight percent, specifically about 91 to about 94 weight percent. Within the range of about 1 to about 10 weight percent, the unmodified clay amount can be about 2 to about 8 weight percent, specifically about 3 to about 6 weight percent, more specifically about 3 to about 5 weight percent. Within the range of about 1 to about 7 weight percent, the carbon nanotube amount can be about 2 to about 5 weight percent, specifically about 2 to about 4 weight percent. All of the variations of the unmodified clay described above in the context of the method are applicable as well to the dispersion itself. For example, in some embodiments, the unmodified clay comprises montmorillonite.

Other embodiments include polymer compositions prepared according to the above-described methods, polymer compositions obtainable by the above methods, and articles comprising the polymer compositions. The phrase "polymer compositions obtainable by the above methods" includes not only polymer compositions that are literally prepared by the above-described methods, but also polymer compositions prepared by other methods that have substantially the same compositions, morphologies, and properties as polymer compositions prepared by the above-described methods.

Useful articles that can be prepared from the composition include electrical and automotive connectors, electrical devices such as switches, and electrical enclosures such as junction boxes, lighting enclosures, and sockets. Injection molding is a presently preferred method of forming articles from the composition.

The invention includes at least the following embodiments.

Embodiment 1: A method of incorporating an additive into a polyamide-poly(arylene ether) composition, comprising: melt blending a polyamide, a poly(arylene ether), and a dispersion comprising a liquid carrier, an unmodified clay, and an additive.

Embodiment 2: The method of embodiment 1, wherein the melt blending is conducted under conditions effective to evaporate the liquid carrier.

Embodiment 3: The method of embodiment 1 or 2, wherein the liquid carrier is selected from the group consisting of water, $C_1$-$C_{18}$ alcohols, $C_2$-$C_{18}$ aldehydes, $C_3$-$C_{18}$ ketones, $C_3$-$C_{18}$ esters, $C_2$-$C_{18}$ ethers, mineral oils, organic oils, $C_4$-$C_{18}$ aliphatic hydrocarbon solvents, $C_6$-$C_{18}$ aromatic hydrocarbon solvents, liquidized gases, and mixtures thereof.

Embodiment 4: The method of any of embodiments 1-3, wherein the liquid carrier comprises water.

Embodiment 5: The method of any of embodiments 1-4, wherein the unmodified clay is selected from the group consisting of kaolinite, dicktite, nacrite, pyrophyillite, talc, vermiculite, sauconite, saponite, nontronite, montmorillonite, illite, amesite, baileychlore, chamosite, clinochlore (kaemmererite), cookeite, corundophilite, daphnite, delessite, gonyerite, nimite, odinite, orthochamosite, penninite, pannantite, rhipidolite (prochlore), sudoite, thuringite, and mixtures thereof.

Embodiment 6: The method of any of embodiments 1-5, wherein the unmodified clay comprises montmorillonite.

Embodiment 7: The method of any of embodiments 1-6, wherein the additive is selected from the group consisting of colorants, electrically conductive agents, stabilizers, antioxidants, mold release agents, flame retardants, drip retardants, UV blockers, fragrances, anti-static agents, metal deactivators, antiblocking agents, impact modifiers, and fillers.

Embodiment 8: The method of any of embodiments 1-7, wherein the additive comprises conductive carbon black, carbon nanotubes, or a combination thereof.

Embodiment 9: The method of any of embodiments 1-8, wherein the additive comprises carbon nanotubes.

Embodiment 10: The method of any of embodiments 1-9, wherein the dispersion has a viscosity of about 10 to about 1,000,000 centipoise at 25° C. and a shear rate in the range of about 50 to about 450 $sec^{-1}$.

Embodiment 11: The method of any of embodiments 1-10, wherein the dispersion comprises about 80 to about 98.9 weight percent of the liquid carrier, about 1 to about 10 weight percent of the unmodified clay, and about 0.1 to about 10 weight percent of the additive, wherein the weight percents of the liquid carrier, the unmodified clay, and the additive are based on the weight of the dispersion.

Embodiment 12: The method of embodiment 1, wherein the dispersion comprises about 83 to about 98 weight percent of the liquid carrier; wherein the liquid carrier comprises water wherein the dispersion comprises about 1 to about 10 weight percent of the unmodified clay; wherein the unmodified clay comprises montmorillonite; wherein the dispersion comprises about 1 to about 7 weight percent of the additive; wherein the additive comprises carbon nanotubes; and wherein the weight percents of the liquid carrier, the unmodified clay, and the additives are based on the weight of the dispersion.

Embodiment 13: A polyamide-poly(arylene ether) composition prepared according to the method of embodiment 1.

Embodiment 14: A polyamide-poly(arylene ether) composition prepared according to the method of embodiment 12.

Embodiment 15: A polyamide-poly(arylene ether) composition obtainable by the method of embodiment 1.

Embodiment 16: A polyamide-poly(arylene ether) composition obtainable by the method of embodiment 12.

Embodiment 17: An article comprising the polyamide-poly(arylene ether) composition of embodiment 13.

Embodiment 18: An article comprising the polyamide-poly(arylene ether) composition of embodiment 14.

Embodiment 19: An article comprising the polyamide-poly(arylene ether) composition of embodiment 15.

Embodiment 20: An article comprising the polyamide-poly(arylene ether) composition of embodiment 16.

The invention is further illustrated by the following non-limiting examples.

EXAMPLE 1, COMPARATIVE EXAMPLES 1-3

These examples describe the preparation of electrically conductive poly(arylene ether)-polyamide compositions by various methods. Components used in the working examples are summarized in Table 1.

TABLE 1

| Component | Description |
|---|---|
| PPE | Poly(2,6-dimethyl-1,4-phenylene ether) (CAS Reg. No. 25134-01-4) having an intrinsic viscosity of about 0.4 deciliter per gram, measured at 25° C. in chloroform; obtained from SABIC Innovative Plastics as PPO 803 |
| PA66 | Polyamide-6,6 (CAS Reg. No. 32131-17-2) having a reduced viscosity of about 120-130 milliliters/gram and an amino endgroup concentration of about 40-60 milliequivalents/gram; obtained from Rhodia |
| PA6 | Polyamide-6 (CAS Reg. No. 25038-54-5), having a reduced viscosity of about 110-140 milliliters/gram and an amino endgroup concentration of about 90-110 milliequivalents/gram; obtained from Rhodia |
| SEBS | Polystyrene-poly(ethylene-butylene)-polystyrene triblock copolymer (CAS Reg. No. 66070-58-4) having a polystyrene content of about 30-33 weight percent; obtained from Kraton Polymers as KRATON G1651 |
| SEP | Polystyrene-poly(ethylene-propylene) diblock copolymer (CAS Reg. No. 68648-89-5) having a polystyrene content of about 37 weight percent; obtained from Kraton Polymers as KRATON G1701 |
| CA | Citric acid (CAS Reg. No. 77-92-9), obtained from Jungbunzlauer |
| Stabilizer | A hindered phenol stabilizer, octadecyl 3-(3,5-di-tert-butyl-4-hydroxyphenyl)propionate (CAS Reg. No. 2082-79-3), obtained from Ciba as IRGANOX 1076 |
| KI soln. | Potassium iodide (CAS Reg. No. 7681-11-0) 50 weight percent solution in water |
| CuI | Cuprous iodide (CAS Reg. No. 7681-65-4) |
| CB | Conductive carbon black (CAS Reg. No. 133-86-4); obtained from AkzoNobel as KETJENBLACK EC-600JD |
| CNT | Multiwall carbon nanotubes (CAS Reg. Nos. 7440-44-0, 7782-42-5) having an average diameter of about 9.5 nanometers, an average length of about 1.5 micrometers, a carbon content of about 90 weight percent, a metal oxide content of about 10 weight percent, and a BET surface area of about 250-300 meter2/gram; obtained from Nanocyl as NANOCYL NC7000 |
| CNT/PA | Masterbatch of 20 weight percent multiwall carbon nanotubes in polyamide-6,6; obtained from Hyperion Catalysis as MB4620-00 |
| Clay | Natural (unmodified) montmorillonite clay (CAS Reg. No. 1302-78-9), obtained from Southern Clay Products as CLOISITE Na+ |
| CNT/clay/PA | Masterbatch of 3.5 weight percent multiwall carbon nanotubes and 7 weight percent clay in polyamide-6,6 |
| CNT/clay/H$_2$O | Dispersion of 3 weight percent carbon nanotubes and 4 weight percent clay in water |

The extruder used for all experiments was a Werner and Pfleiderer twin-screw extruder with a diameter of 28 millimeters, operating at a cylinder temperature of 300° C.

In a first experiment (Comparative Example 1), poly (arylene ether) and citric acid were introduced together with two impact modifiers and stabilizers at the throat of the extruder. Using a feedport located approximately ⅓ downstream the length of the extruder, polyamide-6 and polyamide-6,6 were added. Using a feedport approximately ⅔ downstream the length of the extruder, a conductive carbon black was added.

In a second experiment (Comparative Example 2), poly (arylene ether) and citric acid were introduced together with two impact modifiers and stabilizers at the throat of the extruder. Using a feedport located approximately ⅓ downstream the length of the extruder, polyamide-6,6 and a masterbatch consisting of 80 weight percent polyamide-6,6 and 20 weight percent multiwall carbon nanotubes were added.

In a third experiment (Example 1), poly(arylene ether) and citric acid were introduced together with two impact modifiers and stabilizers at the throat of the extruder. Using a feedport located approximately ⅓ downstream the length of the extruder, polyamide 6 and a masterbatch consisting of 89.5 weight percent polyamide-6,6, 3.5 weight percent multiwall carbon nanotubes, 7 weight percent of clay were added. This masterbatch was produced by compounding a dispersion containing carbon nanotubes, clay, water, with polyamide-6,6. The dispersion of carbon nanotubes, clay, water was produced as follows. Unmodified clay and carbon nanotubes were added to water in such a way that first half of the clay and then all of the carbon nanotubes are added to 70% of the necessary water. After addition of the second half of the clay the rest of the water is added. The components are mixed in a steel bucket with a standard mixer device driven by an electric drill. The dispersion is prepared one day in advance. While not wishing to be bound by any particular theory of operation, the inventors believe that the dispersion of clay is enhanced by the one day aging because the water has time to diffuse into the agglomerates and swell the clay to nearly the same extend over the whole dispersion. This causes that in the distribution step nearly no agglomerates have to be destroyed (dispersed) and distributed in the polymer (here, dispersion means separation of single platelets of the clay and distribution means arranging particles in the polymer matrix. The aging can be accelerated by using hot water and a high shear mixing device for preparing the dispersion, in which case the one day aging can be reduced to two hours or even less. On aging, the dispersion becomes stiff, but after some mixing it becomes less viscous again. During the aging the so-called card house structure is formed by hydrogen bonding of the edges of clay to each other. By mixing again this card house structure is destroyed and the dispersion become fluid.

After the dispersion is prepared, the masterbatch is prepared as follows. The extruder used for masterbatch preparation is a 27 millimeter twin-screw extruder from Leistritz. The extruder has 11 barrels. Polyamide-6,6 is added at the first barrel and the dispersion is added at the fifth barrel. At the fourth barrel there is an atmospheric vent and at the ninth barrel there is a ventport maintained at an absolute pressure of about 50 millibar (5 kilopascals). The dispersion is added at a point where the screw is not completely filled. All barrels are maintained at a temperature of 270° C., and the barrels around the point where the dispersion is added are equipped with electrical heating with a higher power. The higher heating power is intended to compensate for the cooling associated with water evaporation. The dispersion is added using a Seepex screw-feeder with a hopper on it. The feeder is connected to the extruder with some tubing and an injector. The injector does not contain a piston, which only opens the injector at a certain pressure, and instead has a relatively large opening. Before the experiment is started the feeder is calibrated by running for a short period at a certain screwspeed and weighing the collected material out of the injector. It is important that there is no entrained air in the dispersion because this will result in an irregular flow out of the injector and prohibit developing the necessary pressure for injection into the melt. During the experiment the dispersion is frequently pushed down in the hopper, as it does not easily flow down by itself. Also the dispersion level in the hopper is kept approximately constant by topping off in order to keep the pressure of the dispersion more or less constant.

In a fourth experiment (Example 2), a nonconductive compatibilized poly(arylene ether)-polyamide precompound (Comparative Example 3) was first prepared by introducing poly(arylene ether), citric acid, two impact modifiers, and stabilizers at the throat of the extruded, and introducing a polyamide-6,6 downstream via a feedport located approximately ⅓ downstream the length of the extruder. This precompound (Comparative Example 3) was then re-extruded by introducing it in at the throat of a compounder while downstream a dispersion containing carbon nanotubes, clay, and water was fed via a procedure similar to that described above in the context of Example 1.

In a fifth experiment (Example 3), poly(arylene ether) and citric acid were introduced together with two impact modifiers and stabilizers at the throat of the extruder. Using a feedport located approximately ⅓ downstream the length of the extruder, polyamide-6 and polyamide-6,6 were added. Further downstream, a dispersion containing carbon nanotubes, clay, and water was added. For dispersion addition, the procedure of Example 1 was used, except that the extruder used in this experiment was a three-lobe ZSK 28 extruder from Werner and Pfleiderer with barrels maintained at a temperature of 300° C. The dispersion was fed using a screw feeder approximately ⅔ down the length of the extruder.

It is important to note that unmodified clay is used to prepare the dispersions of the inventive examples, as modified clays (so-called organoclays) may interfere with the poly(arylene ether)-polyamide compatibilization reaction and/or may not survive the very high compounding temperatures required in the manufacturing process of such blends.

Although small variations in component amounts preclude rigorous pair-wise comparisons, the results generally illustrate that the dispersion method of the present invention makes it possible to prepare conductive polymer compositions having properties similar to those of corresponding compositions prepared using conventional polymer-based masterbatches of conductive fillers.

TABLE 2

|  | C. Ex. 1 | C. Ex. 2 | Ex. 1 |
|---|---|---|---|
| COMPONENTS | | | |
| added at feedthroat | | | |
| C. Ex. 3 | 0 | 0 | 0 |
| PPE | 35.19 | 38.49 | 36.89 |
| SEBS | 7 | 7 | 7 |
| SEP | 7 | 3.5 | 7 |
| CA | 0.7 | 0.7 | 0.7 |
| Stabilizer | 0.3 | 0.3 | 0.3 |
| KI soln. | 0.1 | 0.1 | 0.1 |
| CuI | 0.01 | 0.01 | 0.01 |
| CB | 1.7 | 0 | 0 |
| added at side feeder | | | |
| PA6 | 10 | 0 | 10 |
| PA66 | 38 | 44.4 | 0 |
| CNT/PA | 0 | 5.5 | 0 |
| CNT/clay/PA | 0 | 0 | 38 |
| added at dispersion feeder | | | |
| CNT/clay/H$_2$O | 0 | 0 | 0 |
| PROPERTIES | | | |
| Volume resistivity (ohm-cm) | 2,500 | 2,500 | 1,000 |
| Tensile modulus (MPa) | 2100 | 2100 | 2300 |
| Tensile elongation at break (%) | 30 | 40 | 25 |
| Notched Izod impact (kJ/m$^2$) | 17 | 20 | 16 |
| Vicat temperature (° C.) | 180 | 192 | 184 |

|  | C. Ex. 3 | Ex. 2 | Ex. 3 |
|---|---|---|---|
| COMPONENTS | | | |
| added at feedthroat | | | |
| C. Ex. 3 | — | 60 | 0 |
| PPE | 35.89 | 0 | 33.09 |
| SEBS | 7 | 0 | 7 |
| SEP | 8 | 0 | 8 |
| CA | 0.7 | 0 | 0.7 |
| Stabilizer | 0.3 | 0 | 0.3 |
| KI soln. | 0.1 | 0 | 0.1 |
| CuI | 0.01 | 0 | 0.01 |
| CB | 0 | 0 | 0 |
| added at side feeder | | | |
| PA6 | 0 | 0 | 10 |
| PA66 | 48 | 0 | 38 |
| CNT/PA | 0 | 0 | 0 |
| CNT/clay/PA | 0 | 0 | 0 |
| added at dispersion feeder | | | |
| CNT/clay/H$_2$O | 0 | 40 | 40 |
| PROPERTIES | | | |
| Volume resistivity (ohm-cm) | — | 1,500 | 1,000 |
| Tensile modulus (MPa) | — | 2200 | 2200 |
| Tensile elongation at break (%) | — | 30 | 35 |
| Notched Izod impact (kJ/m$^2$) | — | 17 | 20 |
| Vicat temperature (° C.) | — | 192 | 182 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of incorporating an additive into a polyamide-poly(arylene ether) composition, comprising:
   melt blending
     about 30 to about 70 weight percent of a polyamide,
     about 20 to about 50 weight percent of a poly(arylene ether), and
     a dispersion comprising
       a liquid carrier,
       an unmodified clay, and
       an additive;
   wherein the weight percent values are based on the total weight of the polyamide-poly(arylene ether) composition.

2. The method of claim 1, wherein the melt blending is conducted under conditions effective to evaporate the liquid carrier.

3. The method of claim 1, wherein the liquid carrier is selected from the group consisting of water, $C_1$-$C_{18}$ alcohols, $C_2$-$C_{18}$ aldehydes, $C_3$-$C_{18}$ ketones, $C_3$-$C_{18}$ esters, $C_2$-$C_{18}$ ethers, mineral oils, organic oils, $C_4$-$C_{18}$ aliphatic hydrocarbon solvents, $C_6$-$C_{18}$ aromatic hydrocarbon solvents, liquidized gases, and mixtures thereof.

4. The method of claim 1, wherein the liquid carrier comprises water.

5. The method of claim 1, wherein the unmodified clay is selected from the group consisting of kaolinite, dicktite, nacrite, pyrophyillite, talc, vermiculite, sauconite, saponite, nontronite, montmorillonite, illite, amesite, baileychlore, chamosite, clinochlore (kaemmererite), cookeite, corundophilite, daphnite, delessite, gonyerite, nimite, odinite, orthochamosite, penninite, pannantite, rhipidolite (prochlore), sudoite, thuringite, and mixtures thereof.

6. The method of claim 1, wherein the unmodified clay comprises montmorillonite.

7. The method of claim 1, wherein the additive is selected from the group consisting of colorants, electrically conductive agents, stabilizers, antioxidants, mold release agents, flame retardants, drip retardants, UV blockers, fragrances, anti-static agents, metal deactivators, antiblocking agents, impact modifiers, and fillers.

8. The method of claim 1, wherein the additive comprises conductive carbon black, carbon nanotubes, or a combination thereof.

9. The method of claim 1, wherein the additive comprises carbon nanotubes.

10. The method of claim 1, wherein the dispersion has a viscosity of about 10 to about 1,000,000 centipoise at 25° C. and a shear rate in the range of about 50 to about 450 $sec^{-1}$.

11. The method of claim 1, wherein the dispersion comprises
    about 80 to about 98.9 weight percent of the liquid carrier,
    about 1 to about 10 weight percent of the unmodified clay, and
    about 0.1 to about 10 weight percent of the additive,
      wherein the weight percents of the liquid carrier, the unmodified clay, and the additive are based on the weight of the dispersion.

12. The method of claim 1,
    wherein the dispersion comprises about 83 to about 98 weight percent of the liquid carrier;
    wherein the liquid carrier comprises water;
    wherein the dispersion comprises about 1 to about 10 weight percent of the unmodified clay;
    wherein the unmodified clay comprises montmorillonite;
    wherein the dispersion comprises about 1 to about 7 weight percent of the additive;
    wherein the additive comprises carbon nanotubes; and
    wherein the weight percents of the liquid carrier, the unmodified clay, and the additives are based on the weight of the dispersion.

* * * * *